United States Patent [19]
Hunter et al.

[11] 4,105,601
[45] Aug. 8, 1978

[54] 3,3'-CARBONYLBIS(CARBAZATES) AS BLOWING AGENTS

[75] Inventors: Byron Alexander Hunter, Woodbridge; Franklin Herbert Barrows, Beacon Falls, both of Conn.

[73] Assignee: Uniroyal, Inc., New York, N.Y.

[21] Appl. No.: 782,673

[22] Filed: Mar. 30, 1977

[51] Int. Cl.$^2$ .............................................. C08J 9/10
[52] U.S. Cl. ................................... 521/95; 560/137; 560/158; 521/180; 521/182; 521/189
[58] Field of Search .................. 260/2.5 HA, 2.5 HB, 260/2.5 R, 2.5 N, 2.5 E; 560/137, 158

[56] References Cited
U.S. PATENT DOCUMENTS 3,925,270   12/1975   Hunter .............................. 260/2.5 R Primary Examiner—Morton Foelak
Attorney, Agent, or Firm—Willard R. Sprowls

[57] ABSTRACT

Novel blowing agents are disclosed comprising 3,3'-carbonylbis(organo carbazates). The organo group may be alkyl, cycloalkyl, aryl or aralkyl moieties. In the preferred embodiment the organo group is an alkyl group selected from the group consisting of methyl, isopropyl, secondary butyl or tertiary butyl. The blowing agents find utility in the preparation of expanded organoplastic materials such as rubbers, thermosetting resins and thermoplastic resins.

9 Claims, No Drawings

3,3'-CARBONYLBIS(CARBAZATES) AS BLOWING AGENTS

BACKGROUND OF THE INVENTION

The formation of cellular polymeric materials by heating a polymeric substance in the presence of certain heat sensitive nitrogen compounds is well known. The characteristics of the expanded product will vary markedly with the specific gas-forming agent used, and selection of the agent for any particular purpose will depend upon the requirements of the intended application. For example, U.S. Pat. No. 2,421,831 discloses diazoaminobenzene as a very effective expanding agent for rubber. This compound, however, suffers from the fact that the material is strongly staining and discoloring and only dark colored cellular rubber or plastic products can be produced when it is used. Freedom from discoloration may be achieved, however, if a non-staining blowing agent such as dinitroso pentamethylenetetraamine is employed. The product is described in U.S. Pat. No. 2,491,709. In this case, however, ordorous decomposition products are formed during decomposition of the blowing agent. Employment of the azobis(isobutyronitrile) blowing agent of U.S. Pat. No. 2,484,397 affords a light colored, non-odorous product. Unfortunately a toxic residue is formed from the blowing agent which restricts its application.

Certain organic sulfonhydrazides are free from odor and discoloration features; see, for example, U.S. Pat. No. 2,626,922 and U.S. Pat. No. 2,522,065. These products are widely used as blowing agents, however, their use is limited to applications involving rather restricted temperature ranges. More recently, certain sulfonylcarbazates have been taught to be effective blowing agents; see U.S. Pat. No. 3,925,270 of Hunter. The preparation of carbonylbis-(ethyl carbazate) (ethyl from ethyl carbazate and phosgene is taught in the literature; see *J. Ind. Chem. Soc.* 10,685 (1933), no utility is disclosed for that compound.

SUMMARY OF THE INVENTION

It has surprisingly been found that certain 3,3'-carbonylbis(carbazates) are effective blowing agents for the preparation of expanded polymeric materials. The carbazates of this invention have the general formula

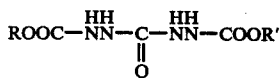

wherein R and R' are organic esterifying groups illustrative examples of which are alkyl, aryl, cycloalkyl, aralkyl, etc. In the preferred embodiments of this invention R and R' are independently selected from the group consisting of methyl, isopropyl, secondary butyl, and tertiary butyl.

DETAILED DESCRIPTION

This invention relates to the use of certain carbonylbis(carbazates) as blowing agents. More particularly, it relates to the use of certain carbonylbis(organocarbazates). The compounds have the general formula

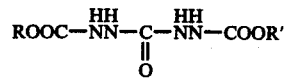

where R and R' are the same or different and are alkyl, cycloalkyl, aryl, or aralkyl; provided, however, where R is ethyl R' is not ethyl. As used in the specification and claims the term "alkyl" means linear and branched primary, secondary and tertiary alkyl moieties.

Illustrative non-limiting examples of the substituent R and R' groups which comprise a part of the carbonylbis-(organocarbazate) of this invention are methyl, ethyl, propyl, isopropyl, butyl, isobutyl, secondary butyl, tertiary butyl, amyl, hexyl, cyclopentyl, cyclohexyl, benzyl and phenyl.

The compounds of this invention may be made by either of two general procedures:

(1) The reaction of an alkyl carbazate with phosgene:

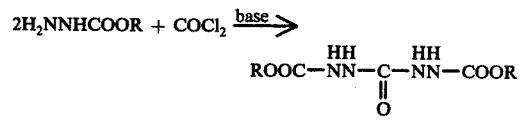

(2) The reaction of carbohydrazide with a chloroformate:

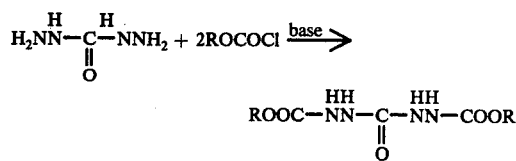

It will be recognized that this reaction can be the source of unsymmetrically substituted compounds by reacting carbohydrazide with two different chloroformate compounds in sequential order. Similarly, unsymmetrically substituted compounds may be made by reacting mixtures of organocarbazates having different organo groups with phosgene.

Illustrative examples of R and R' in the organocarbazates of this invention where each radical is different than the other are: ethyl, methyl; isopropyl, methyl; butyl, methyl; t-butyl, methyl; isopropyl, butyl; isopropyl, t-butyl; ethyl, isopropyl; ethyl, t-butyl; ethyl, t-butyl; n-butyl, t-butyl; methyl, phenyl; methyl, cyclopentyl; isopropyl, cyclohexyl; and t-butyl, cyclohexyl.

Preferably R and R' are independently selected from the group consisting of $C_1$ to $C_6$ alkyl, $C_5$ to $C_6$ cycloalkyl, phenyl and benzyl.

Another variation of the invention utilizes bifunctional chloroformates, such as ethylenebis chloroformate in interaction with carbohydrazide, as shown by the following equation:

(3) 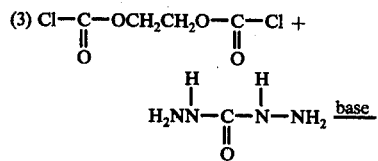

-continued

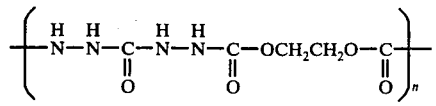

The product in this case will be oligomeric or polymeric in nature and "n" may vary from about 1 to about 100. The molecular weight of the molecule will depend upon the proportion of reactants, as will the end groups. Where the carbohydrazide is in excess, the end groups will be chloroformates. The preferred product is produced by using a slight excess of carbohydrazide.

The following examples illustrate the method of preparing the various organocarbazates of this invention.

EXAMPLE I

Preparation of 3,3'-Carbonylbis(methyl carbazate)

A mixture of 90 g (1.0 mole) methyl carbazate, 110 g $NaHCO_3$ and 250 ml water was stirred in a two liter 3 necked flask and cooled to 5° C. (ice water bath). Phosgene (55 g) was passed into the mixture during the course of 1 hour, keeping the temperature under 10° C. The mixture was stirred an additional two hours at 10° C and was then filtered. The white crystalline product was washed with ice water and dried yielding 80 g of material. This material was dissolved in 200 ml of water, by warming. The solution was filtered and then cooled until the product crystallized. This was filtered and dried. Yield = 66 g; melting point (mp) 225–226° C.

Analysis:

| Calc. for $C_5H_{10}N_4O_5$ | Found |
|---|---|
| % C 29.1 | 28.5 |
| H 4.86 | 4.87 |
| N 27.19 | 26.85 |

EXAMPLE II

Preparation of 3,3'-Carbonylbis(ethyl Carbazate)

A 2-liter 3-necked flask was charged with 90 g (1.0 mole) carbohydrazide, 106 g (1.0 mole) sodium carbonate and 750 ml water. The mix was stirred as 217 g (2.0 moles) of ethyl chloroformate was added over a two hour period. The temperature was not allowed to exceed 45° C. During the latter half of the addition of the chloroformate an addition of 500 ml ethanol was added to control the foaming. After all had been added, the reaction mixture was warmed to reflux temperature (78° C) for 15 minutes. All ingredients passed into solution. At this point 500 ml of water was added, and the mixture was cooled to 20° C. The white precipitate was filtered off, washed well with water and dried at 60° C.
Yield = 159 g; mp 168–173° C.
The product was recrystallized from ethanol
Yield = 159 g; mp 171°–174° C.

Analysis:

| Calc. for $C_7H_{14}N_4O_5$ | Found |
|---|---|
| % C 35.9 | 35.50 |
| H 5.98 | 5.96 |
| N 23.93 | 23.46 |

EXAMPLE III

Preparation of 3,3-Carbonylbis(n-propyl Carbazate)

A mixture of 45 g (0.5 mole) carbohydrazide, 84 g (1.0 mole) sodium bicarbonate and 500 ml ethanol in a 2-liter reaction flask was stirred as 134.7 g (1.1 mole) of n-propyl chloroformate was added dropwise over a period of 1 hour. The temperature rose to 45° C. The mix was then heated to 70° C for one-half hour, and the suspended sodium chloride (60 g) was filtered off. The warm filtrate was cooled to 10° C, and the crystalline precipitate filtered off and washed with ethanol. The dried (60° C) product weighed 101 g and melted at 146°–149° C. Upon standing the filtrate precipitated a further 16 g of product (mp 144°–149° C).

A portion of the initial precipitate was recrystallized from methanol; mp 147°–148.5° C.

Analysis:

| Calc. for $C_9H_{18}N_4O_5$ | Found |
|---|---|
| % C 41.22 | 41.35 |
| H 6.87 | 7.04 |
| N 21.37 | 21.37 |

EXAMPLE IV

Preparation of 3,3'-Carbonylbis(isopropyl Carbazate) Dihydrate

A 2-liter reaction flask was charged with 90 g (1.0 mole) carbohydrazide, 106 g (1.0 mole) sodium carbonate and 750 ml ethanol. The mixture was stirred as 245 g (2.0 mole) of isopropyl chloroformate was added over 1.5 hours. The temperature was not allowed to exceed 50° C. Then the mix was warmed to 75° C for one-half hour. The warm mixture was filtered from 126 g of sodium chloride, and the filtrate poured into 2 liters of ice water. The resulting crystalline solid was filtered, washed with water and dried at 55° C.

Yield = 230 g; mp 82°–78° C. (Dihydrate)

Analysis:

| Calc. for $C_9H_{18}N_4O_5.2H_2O$ | Found |
|---|---|
| % C 36.24 | 36.44 |
| H 7.38 | 7.02 |
| N 18.79 | 18.82 |

A portion of this product recrystallized from hot xylene melted at 161°–162.5° C (Anhydrous form).

Analysis:

| Calc. for $C_9H_{18}N_4O_5$ | Found |
|---|---|
| % C 41.3 | 40.96 |
| H 6.88 | 6.91 |
| N 21.35 | 21.53 |

EXAMPLE V

Preparation of 3,3'-Carbonylbis(n-butyl Carbazate)

A mixture of 90 g (1.0 mole) carbohydrazide, 106 g (1.0 mole) sodium carbonate and 750 ml ethanol was stirred in a 2-liter reaction flask as 287 g (2.1 mole) n-butyl chloroformate was added over one hour, keeping the temperature under 50° C. The mixture was stirred overnight and was then heated to reflux for one hour. The mixture was filtered hot. There was recovered 123 g of sodium chloride and other ethanol insolubles. The alcoholic filtrate was cooled, and the resulting white precipitate was filtered.

Yield = 226 g; mp 146°–149° C. A second crop of crystals were recovered

Yield = 17 g; mp 146°–149° C.

Analysis:

| | Calc. for $C_{11}H_{22}N_4O_5$ | Found |
|---|---|---|
| % C | 45.51 | 45.10 |
| H | 7.58 | 7.59 |
| N | 19.31 | 19.14 |

EXAMPLE VI

Preparation of 3,3'-Carbonylbis(isobutyl Carbazate) Dihydrate

Into a 2-liter reaction flask was charged 45 g (0.5 mole) carbohydrazide, 84 g (1.0 mole) sodium bicarbonate and 500 ml ethanol. The mixture was stirred as 143.5 grams (1.05 mole) of isobutyl chloroformate was added over a 45 minute period. The temperature rose to 50° C. The mix was then heated to 60° C for 1 hour, and the precipitated sodium chloride (60 g) was filtered off (hot). The filtrate was evaporated (steam bath). The residue was dissolved in methanol, and the product reprecipitated by pouring into water. The crystalline product was filtered. Yield = 116 g; mp 62°–65° C. When recrystallized from a methanol water mix the melting point was 63°–65° C.

Analysis:

| | Calc. for $C_{11}H_{22}N_4O_5 \cdot 2H_2O$ | Found |
|---|---|---|
| % C | 40.49 | 40.31 |
| H | 7.98 | 7.41 |
| N | 17.18 | 16.94 |

EXAMPLE VII

Preparation of 3,3'-Carbonylbis(sec-butyl Carbazate)

A mixture of 66 g (0.5 mole) sec butyl carbazate, 55 g $NaHCO_3$ and 500 ml water was stirred at 10° C as 30 g phosgene was passed into the mix and stirred for 2 hours, at which time the product had crystallized. This material was filtered, washed and dried.

Yield = 45.5 g; mp 115°–117° C

Analysis:

| | Calc. for $C_{11}H_{22}N_4O_5$ | Found |
|---|---|---|
| % C | 45.5 | 45.33 |
| H | 7.58 | 7.58 |
| N | 19.3 | 18.93 |

EXAMPLE VIII

Preparation of 3,3'-Carbonylbis(cyclohexyl Carbazate)

A mixture of 45 g (0.5 mole) carbohydrazide, 53 g (0.5 mole) sodium carbonate and 500 ml ethanol in a 2-liter 3-necked flask was stirred as 182 g (1.1 mole) cyclohexyl chloroformate was added over one hour, holding the temperature under 50° C. The sodium chloride was filtered off (61 g). The ethanol was evaporated from the filtrate and the oily residue was crystallized from a 50/50 mix of benzene and hexane.

Yield = 110 g; mp 110°–114° C,

A portion was recrystallized from a 50/50 mixture of benzene and hexane; mp 102°–105° C.

Analysis:

| | Calc. for $C_{15}H_{26}N_4O_5$ | Found |
|---|---|---|
| % C | 52.63 | 53.18 |
| H | 7.60 | 7.30 |
| N | 16.38 | 16.31 |

EXAMPLE IX

Preparation of 3,3'-Carbonylbis(benzyl Carbazate)

A 2-liter 3-necked flask was charged with 45 g (0.5 mole) carbohydrazide, 58 g (0.5 mole) sodium carbonate, and 500 ml ethanol. 18.7 g (1.1 mole) of benzyl chloroformate was added over one hour, holding the reaction temperature under 50° C. The mixture was cooled and filtered. The product was washed well with water and dried.

Yield = 154 g; mp 172°–175° C.

After standing, a second crop of crystals was filtered from the filtrate. Yield = 9 g; mp 168°–174° C.

Analysis:

| | Calc. for $C_{17}H_{18}N_4O_5$ | Found |
|---|---|---|
| % C | 56.98 | 56.71 |
| H | 5.03 | 4.96 |
| N | 15.64 | 15.47 |

EXAMPLE X

Preparation of 3,3'-Carbonylbis(tert-butyl Carbazate)

A mixture of 13.2 g (0.1 mole) tert-butyl carbazate, 8.4 g (0.1 mole) sodium bicarbonate and 200 ml ethanol was stirred as 5.0 g (0.05 mole) or phosgene was passed in over 10 minutes. The mixture was then heated to reflux for 2 hours. The separated sodium chloride was filtered off, and the ethanolic filtrate evaporated on a steam bath. The residual oil gradually crystallized (mp 60°–110° C.). Recrystallization from benzene yielded the pure 3,3'-carbonylbis(tert-butyl carbazate) mp 147°–149° C., dec. 150°–200° C.

Analysis:

| | Calc. for $C_{11}H_{22}N_4O_5$ | Found |
|---|---|---|
| % C | 45.52 | 45.47 |
| H | 7.59 | 7.97 |
| N | 19.31 | 19.31 |

Also recovered from the benzene filtrate was another compound, mp 92°–95° C.

Analysis:

| | Calc. for $C_8H_{16}N_2O_4$ | Found |
|---|---|---|
| % C | 47.06 | 47.05 |
| H | 7.84 | 8.19 |
| N | 13.73 | 13.81 |

This corresponds to 1-carbethoxy-2-carbo-t-butoxy hydrazine.

EXAMPLE XI

Gas Evolutions Of Various Carbonylbis(Carbazates)

The utility of a blowing agent and its efficiency will be a function of the quantity of gas which is generated at a given temperature. The amount of gas released by the various carbazates of this invention was determined by heating a weighed quantity of compound at a temperature sufficiently high to cause its decomposition in the presence of a heat transfer medium (dioctyl phthalate). The volume of gas evolved was determined by differential readings in a mercury filled gas burrette. The volume of gas converted to standard conditions (0° C. and 760 mm pressure) produced by a number of carbonylbis(organocarbazates) was measured and is shown in the following table.

| | | Cc gas evol./gram | Decomposition temp, °C. |
|---|---|---|---|
| 2,3'-Carbonylbis | (methyl carbazate) | 127.5 | 280 |
| " | (ethyl ") | 93.7 | 280 |
| " | (n-propyl ") | 97.1 | 280 |
| " | (isopropyl ") | 216.6 | 280 |
| " | (n-butyl ") | 68.75 | 280 |
| " | (sec-butyl ") | 209.7 | 280 |
| " | (tert-butyl") | 297 | 230 |
| " | (cyclohexyl ") | 91.1 | 280 |
| " | (benzyl ") | 80.5 | 280 |
| " | (phenyl ") | 44.5 | 280 |

It can be seen from the above data that where the organo-group is methyl, isopropyl, secondary butyl or tertiary butyl the compounds exhibit exceptional efficiency as blowing agents. Particular types of polymeric compositions into which the blowing agents of this invention may be incorporated will depend on the processing temperatures used. Similarly, various constituents with which the polymer is blended may effect the decomposition temperature of the product, thereby allowing a wide range of use.

The blowing agent of this invention is applicable to the preparation of expanded products from any of the usual gas-expandable polymeric materials. Such polymers are capable of setting to a normally solid state and have sufficient consistency and tensile strength under the conditions of the expansion step to retain the evolved expanding gas. These polymeric materials include rubbery polymers, thermosetting resins and thermoplastic resins.

The term "polymeric material" as used herein means homopolymers, interpolymers graft polymers, and mixtures and blends of two or more of these, and includes thermoplastic, thermosetting and rubbery polymers. In particular, the new blowing agents of the invention are useful for expanding polymers that have high processing temperatures such as the polycarbonates, phenylene oxide-based resins, poly(arylsulfones), polyamides, polyesters, certain polystyrenes, polypropylene, poly(styrene-acrylonitrile), polyacetals, poly(methylpentene), polyimides, poly(aryl ethers), ABS polymers, polyacrylics, cellulosic polymers, halogenated polymers, especially the fluoroplastics, poly(ethylene-vinyl acetate), and polymer alloys.

Generally, the amount of blowing agent used will depend on the nature of the polymeric material to be expanded, and the desired density of the foam to be produced. Usually, 0.05 to 15, and, most often, 0.1 to 5.0 parts blowing agent are employed, based on 100 parts of polymeric material by weight. The blowing agents can be used alone, or in combination with other blowing agents.

The utility of the blowing agents of this invention for the expansion of polymers having high melting temperatures is demonstrated by the following examples.

EXAMPLE XII

Expansion of Modified Polyphenylene Oxide Polymer (Noryl) With Carbonylbis Carbazates Polyphenylene oxide polymer (Noryl) pellets were tumbled in a plastic bag for 10 minutes with 1% of each of the blowing agents listed below. The mixes were added to the hopper in a laboratory extruder under the conditions shown. The unexpanded Noryl resin has a specific gravity of 1.10.

| Blowing Agent | Temperature °F | | | Screw Speed RPM | Stock Temp° F | Specific Gravity |
|---|---|---|---|---|---|---|
| | Rear | Front | Die | | | |
| 3,3'-Carbonylbis(methyl carbazate) | 530 | 575 | 520 | 30 | 550 | 0.6192 |
| 3,3'-Carbonylbis(n-prpyl carbazate) | 540 | 580 | 530 | 30 | 560 | 0.8718 |
| 3,3'-Carbonylbis(iso-propyl carbazate) | 540 | 580 | 530 | 30 | 560 | 0.5044 |
| 3,3'-Carbonylbis(n-butyl carbazate) | 540 | 570 | 530 | 30 | 550 | 0.8306 |
| 3,3'-Carbonylbis(sec-butyl carbazate) | 530 | 570 | 520 | 30 | 550 | 0.5308 |

As can be seen, each of the compounds lowered the density of the polymer substantially. The secondary alkyl compounds appear particularly efficient. The methyl compound is also very effective.

EXAMPLE XIII

Expansion Of Polysulfone With Carbonylbis(Carbazates

Polysulfone pellets were tumbled in a plastic bag for ten minutes with 1% of each of the blowing agents. The mixes were added to the hopper in a laboratory extruder under the conditions shown. The unexpanded polysulfone has a specific gravity of 1.2299.

| Blowing Agent | Temperature °F | | | Screw Speed RPM | Stock Temp °F | Specific Gravity |
|---|---|---|---|---|---|---|
| | Rear | Front | Die | | | |
| 3,3'-Carbonylbis(methyl carbazate) | 580 | 600 | 540 | 30 | 560 | 0.6498 |
| 3,3'-Carbonylbis(n-propyl carbazate) | 580 | 600 | 540 | 30 | 580 | 0.7460 |
| 3,3'-Carbonylbis(isopropyl carbazate) | 580 | 600 | 540 | 30 | 580 | 0.7052 |

EXAMPLE XIV

Expansion Of Polycarbonate With Carbonylbis(Carbazates

Polycarbonate pellets were tumbled in a plastic bag for ten minutes with 1% of each of the blowing agents. The mixes were added to the hopper in a laboratory extruder under the conditions shown. The unexpanded polycarbonate resin has a specific gravity of 1.20.

| Blowing Agent | Temperature °F Rear | Front | Die | Screw Speed RPM | Stock Temp °F | Specific Gravity |
| --- | --- | --- | --- | --- | --- | --- |
| 3,3'-Carbonylbis(methyl carbazate) | 520 | 560 | 510 | 30 | 540 | 0.8729 |
| 3,3'-Carbonylbis(n-propyl carbazate) | 540 | 580 | 530 | 30 | 550 | 1.1072 |
| 3,3'-Carbonylbis(iso-propyl carbazate) | 540 | 580 | 530 | 30 | 550 | 0.9566 |

It is apparent from the aforegoing examples that the 3,3'-carbonylbis(organo carbazates) of this invention have utility in a wide range of polymers.

What is claimed is:

1. A method of making a gas-expanded polymeric material which comprises blending a carbonylbis(organocarbazate) having the general formula

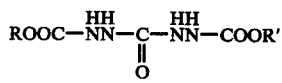

or dihydrates thereof wherein R and R' are the same or different and are $C_1$ to $C_6$ alkyl, $C_5$ to $C_6$ cycloalkyl, phenyl or benzyl, with gas-expandable polymeric material and heating the resultant blend to a temperature sufficiently to decompose said carbonylbis(organocarbazate).

2. The method of claim 1 wherein at least one of R and R' is methyl, isopropyl, sec-butyl or tert-butyl.

3. The method of claim 1 wherein the carbonyl bis(organocarbazate) is 3,3'-carbonylbis(methyl carbazate), 3,3'-carbonylbis(isopropyl carbazate), 3,3'-carbonylbis(secondard butyl carbazate), 3,3'-carbonyl bis(tertiary butyl carbazate).

4. The method of claim 1 wherein the polymeric material is a polycarbonate, polysulfone or polyester.

5. The method of claim 4 wherein the carbonylbis(organocarbazate) is 3,3'-carbonylbis(methyl carbazate), 3,3'-carbonylbis(isopropyl carbazate), 3,3'-carbonylbis(secondary butyl carbazate), 3,3'-carbonylbis(tertiary butyl carbazate).

6. A composition comprising a gas expandable polymeric material and a compound having the general formula

or dihydrates thereof wherein R and R' are the same or different and are $C_1$–$C_6$ alkyl, $C_5$–$C_6$ cycloalkyl, phenyl or benzyl.

7. The composition of claim 6 wherein at least one of R and R' is methyl, isopropyl, sec-butyl or tert-butyl.

8. The composition of claim 6 wherein the compound is 3,3'-carbonylbis(methyl carbazate), 3,3'-carbonylbis(isopropyl carbazate), 3,3'-carbonylbis (sec-butyl carbazate) or 3,3'-carbonylbis(tert-butyl carbazate).

9. The composition of claim 6 wherein the polymeric material is polycarbonate, polysulfone or polyester.

* * * * *